(12) United States Patent
Hanson

(10) Patent No.: US 7,796,396 B2
(45) Date of Patent: Sep. 14, 2010

(54) INTEGRATED CRU LATCH

(75) Inventor: George E. Hanson, Andover, KS (US)

(73) Assignee: LSI Corporation, Milpitas, CA (US)

( * ) Notice: Subject to any disclaimer, the term of this patent is extended or adjusted under 35 U.S.C. 154(b) by 1936 days.

(21) Appl. No.: 10/143,649

(22) Filed: May 10, 2002

(65) Prior Publication Data
US 2003/0214790 A1 Nov. 20, 2003

(51) Int. Cl.
H05K 7/16 (2006.01)
G06F 1/16 (2006.01)
A47F 7/00 (2006.01)
A47B 81/00 (2006.01)
E05C 1/02 (2006.01)
E05C 1/08 (2006.01)
E05C 1/04 (2006.01)
E05C 1/10 (2006.01)

(52) U.S. Cl. .................. 361/726; 361/727; 361/679.58; 211/26; 312/223.2; 292/137; 292/163; 292/146; 292/175; 292/150

(58) Field of Classification Search .................. 361/679, 361/680, 681, 683, 685, 732, 740, 747, 759, 361/787, 801, 728, 729, 730, 679.01–679.45, 361/679.55–679.59, 724–727; 312/223.1, 312/223.2; 360/97.01–99.02; 720/635–644; 292/137, 163, 175, 145, 146, 150, DIG. 63; 211/26

See application file for complete search history.

(56) References Cited

U.S. PATENT DOCUMENTS

| | | | | |
|---|---|---|---|---|
| 3,575,482 A * | 4/1971 | MacMaster et al. | ...... | 312/332.1 |
| 4,553,353 A * | 11/1985 | Simpson | ...... | 49/161 |
| 4,669,765 A * | 6/1987 | Ullman | ...... | 292/153 |
| 4,901,475 A * | 2/1990 | Simpson | ...... | 49/175 |
| 5,139,291 A * | 8/1992 | Schultz | ...... | 292/42 |
| 5,465,191 A * | 11/1995 | Nomura et al. | ...... | 361/681 |
| 5,483,419 A * | 1/1996 | Kaczeus et al. | ...... | 361/685 |
| 5,669,639 A * | 9/1997 | Lawrence | ...... | 292/175 |
| 5,671,958 A * | 9/1997 | Szapucki et al. | ...... | 292/175 |
| 5,767,445 A * | 6/1998 | Wu | ...... | 174/542 |
| 5,793,614 A * | 8/1998 | Tollbom | ...... | 361/732 |
| 5,959,834 A * | 9/1999 | Chang | ...... | 361/685 |
| 5,970,656 A * | 10/1999 | Maier | ...... | 49/181 |
| 6,067,225 A * | 5/2000 | Reznikov et al. | ...... | 361/685 |
| 6,088,221 A * | 7/2000 | Bolognia | ...... | 361/685 |
| 6,115,239 A * | 9/2000 | Kim | ...... | 361/681 |
| 6,178,086 B1 * | 1/2001 | Sim et al. | ...... | 361/683 |
| 6,288,902 B1 * | 9/2001 | Kim et al. | ...... | 361/725 |
| 6,356,441 B1 * | 3/2002 | Claprood | ...... | 361/685 |
| 6,359,778 B1 * | 3/2002 | Wu | ...... | 361/685 |
| 6,378,965 B1 * | 4/2002 | Reznikov et al. | ...... | 312/332.1 |
| 6,392,874 B1 * | 5/2002 | Gan | ...... | 361/683 |
| 6,498,723 B1 * | 12/2002 | Konshak et al. | ...... | 361/685 |

(Continued)

Primary Examiner—Jayprakash N. Gandhi
Assistant Examiner—Nidhi Desai
(74) Attorney, Agent, or Firm—Yee & Associates, P.C.

(57) ABSTRACT

A latch for retaining moving parts on an enclosure service module (ESM) is provided. This latch comprises a retaining groove in the latch that holds a self-clinching standoff fastener attached to the ESM. A return spring is contained within a molded cavity in the latch, and an alignment groove in the latch is placed at one end of the return spring. The alignment groove guides an alignment pin on the ESM into a secure position, and the return spring applies pressure against the pin while the pin is in the alignment groove.

16 Claims, 3 Drawing Sheets

U.S. PATENT DOCUMENTS

| | | | |
|---|---|---|---|
| 6,515,855 B1 * | 2/2003 | Removedummy | 361/685 |
| 6,565,163 B2 * | 5/2003 | Behl et al. | 312/223.1 |
| 6,798,650 B2 * | 9/2004 | Reznikov et al. | 361/685 |
| 6,874,826 B1 * | 4/2005 | Polowinczak et al. | 292/175 |
| 6,912,124 B2 * | 6/2005 | Megason et al. | 361/685 |
| 6,935,661 B1 * | 8/2005 | Farnsworth et al. | 292/162 |
| 7,082,036 B2 * | 7/2006 | Cheng et al. | 361/726 |

\* cited by examiner

INTEGRATED CRU LATCH

BACKGROUND OF THE INVENTION

1. Technical Field

The present invention is directed toward an apparatus for securing insertion/extraction levers on modular computer components.

2. Description of the Related Art

Controller modules and drive trays are modular computer components that are usually connected together in a customer-specified configuration to produce storage systems. Controller modules function as the interface between a host system and the drive tray array. The drive trays use enclosure service modules (ESMs) as the interconnection to the drives contained within a drive tray. The ESMs also perform diagnostic monitor functions for the drive array.

ESM may take the form of customer replaceable units (CRUs), which make up subsystems within a storage system. This provides the customer with more freedom and direct control over the configuration and maintenance of the subsystems. The CRUs contain insertion/extraction levers that are used to install and remove CRUs from a storage system chassis. When these levers are not being used for insertion or extraction, they must be kept firmly folded and retained in place with a latch.

Current approaches to this problem have not been successful. Previous designs were either not substantial or durable enough to do the job, functioned poorly due to their complex nature, or interfered with other structures and features on the face of the Customer Replaceable Unit (CRU). One such unit used a long lever arm that prevented an acceptable label set from being added to the face of the CRU. One unit used a pivoting metal structure that required many components and made it necessary for the user to manipulate the latch with unnatural combinations of rotating and pulling motions. Several designs used perforations through the face of the CRU that allowed the escape of radiated electrical noise. However, none of these previous designs was able to meet the necessary requirements.

Therefore, it would be desirable to have a mechanism for securing the insertion/extraction levers of a CRU that is durable, does not interfere with the structures of the CRU, and is not overly complex.

SUMMARY OF THE INVENTION

The present invention provides a latch for retaining moving parts on an enclosure service module (ESM). This latch comprises a retaining groove in the latch that holds a self-clinching standoff fastener attached to the ESM. A return spring is contained within a molded cavity in the latch, and an alignment groove in the latch is placed at one end of the return spring. The alignment groove guides an alignment pin on the ESM into a secure position, and the return spring applies pressure against the pin while the pin is in the alignment groove.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
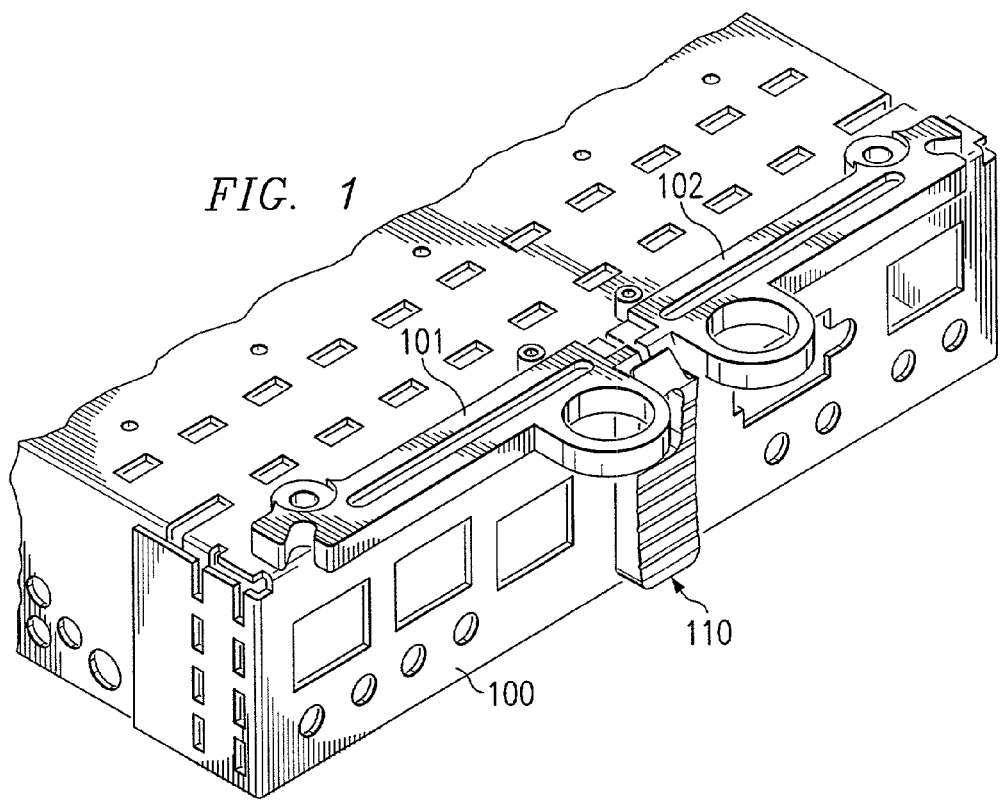
FIG. 1 depicts a front view pictorial diagram illustrating a Customer Replaceable Unit (CRU) with a CRU latch in accordance with the present invention.

With reference now to the figures and in particular with reference to FIG. 1, a front view pictorial diagram illustrating a Customer Replaceable Unit (CRU) with a CRU latch is depicted in accordance with the present invention. The CRU 100 is depicted with its insertion/extraction levers 101 and 102 folded in and locked in place by the latch 110. The latch 110 keeps the levers 101 and 102 locked in this folded position while the CRU 100 is installed in a storage system, or when the CRU 100 is not in use and is being stored.

Figure 2:
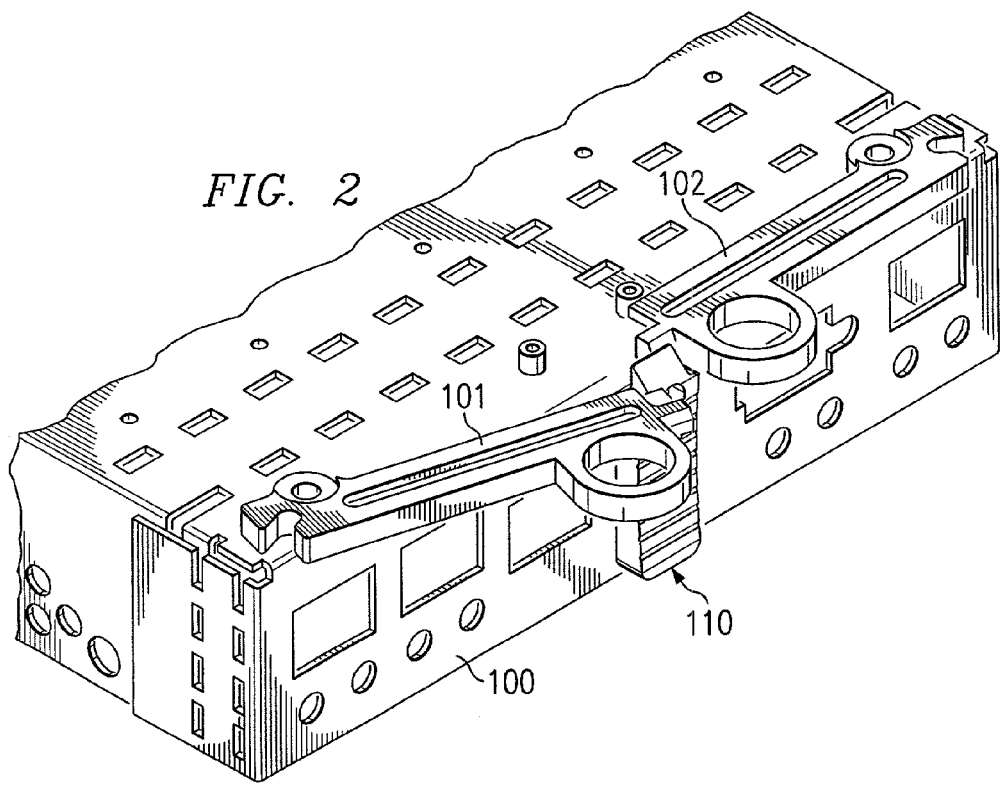
FIG. 2 depicts a perspective view pictorial diagram illustrating a CRU with an extended insertion/extraction lever in accordance with the present invention.

Referring now to FIG. 2, a perspective view pictorial diagram illustrating CRU 100 with an extended insertion/extraction lever 101 is depicted in accordance with the present invention. When the CRU 100 has to be installed or extracted from a storage unit, the levers 101 and 102 are extended and used as handles by service personnel to move the CRU 100 into and out of position. Although the latch 110 is pictured attached to the CRU 100 in FIG. 2 for purposes of illustration, it would normally be removed when the lever 101 is unfolded.

Figure 3:
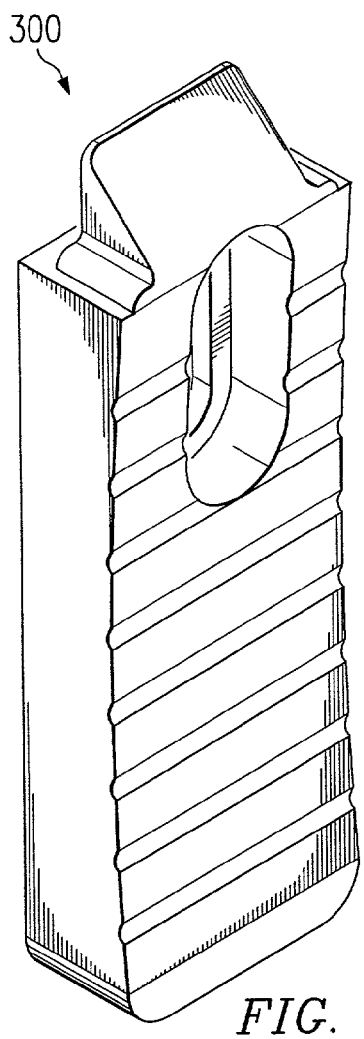
FIG. 3 depicts a front view pictorial diagram illustrating a CRU latch in accordance with the present invention.

Referring to FIG. 3, a front view pictorial diagram illustrating a CRU latch is depicted in accordance with the present invention. The latch 300 is molded from an engineering plastic resin such as Acrylonitrile Butadiene Styrene (ABS) or Lexan or an alloy of both. As can be seen, the front surface is textured and contoured to provide a non-slip grip and to be easy to use. The latch 300 is also designed for visual and functional clarity. The latch 300 uses integral guidance and requires no perforations of the CRU wall upon which is mounted, which maintains a barrier to radiated emissions that would otherwise emanate from such openings.

Figure 4:
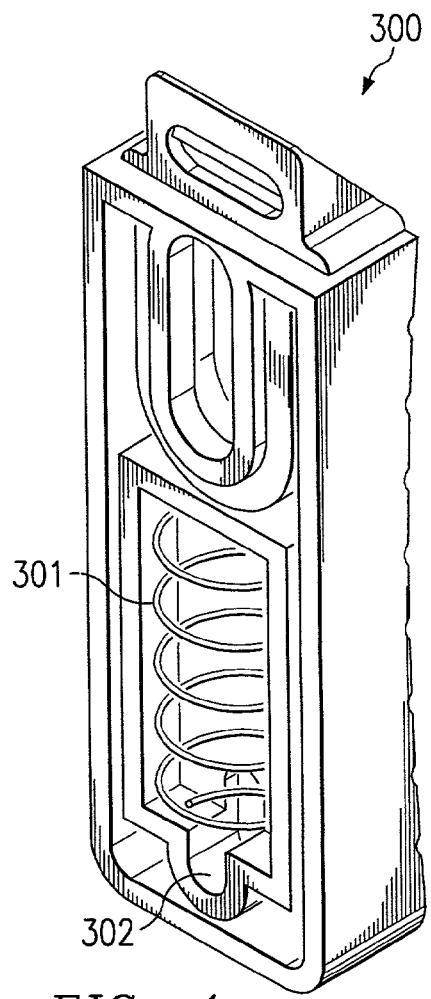
FIG. 4 depicts a rear view pictorial diagram illustrating a CRU latch in accordance with the present invention.

Referring to FIG. 4, a rear view pictorial diagram illustrating a CRU latch is depicted in accordance with the present invention. The present invention is easy to use and has a compact design using a return spring and a pressed-in pin on the CRU for guidance. The return spring 301 is trapped within the body of the latch 300. An alignment track 302 molded into the latch 300 beneath the return spring 301 functions as a track for the pin pressed into the metal body of the CRU (as described below).

Figure 5:
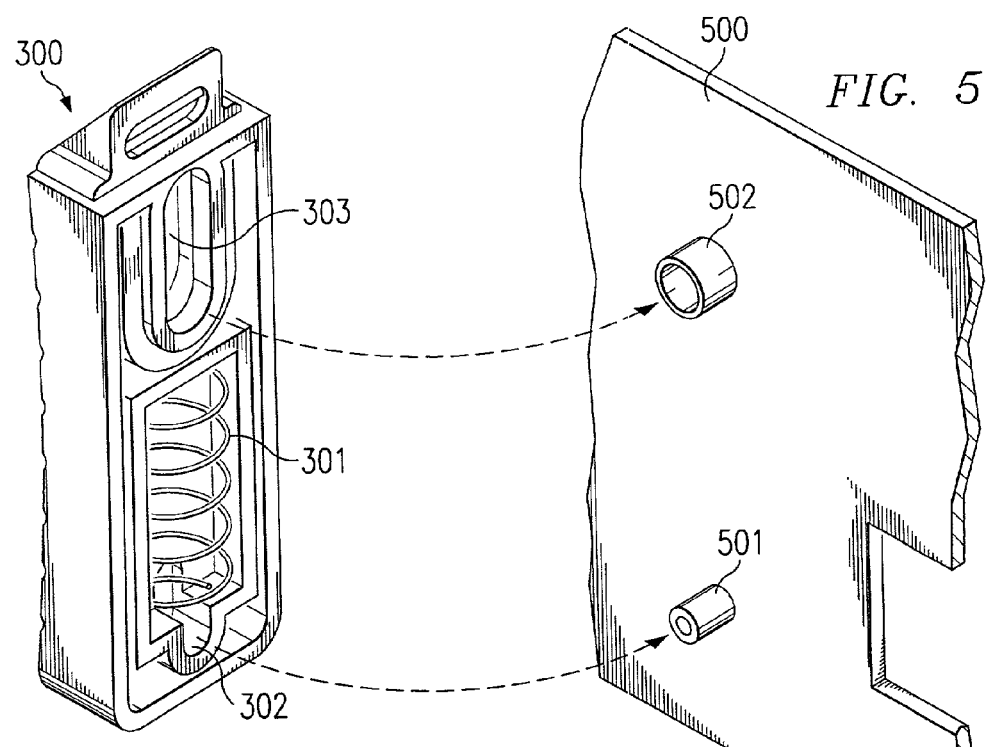
FIG. 5 depicts a pictorial diagram illustrating the relationship between the latch and the mounting points on a CRU is depicted in accordance with the present invention.

Referring to FIG. 5, a pictorial diagram illustrating the relationship between the latch and the mounting points on a CRU is depicted in accordance with the present invention. Installation of the latch 300 on the CRU 500 is simple. The alignment pin 501 on the CRU 500 is guided into the alignment track 302 below the return spring 301. The alignment pin 501 also does "double duty" by compressing the return spring 301, resulting in a very crisp and positive feeling latch operation. When not actuated, the latch return spring 301 is essentially unloaded, except for the retention force that it exerts against the latch cavity. Because the alignment track 302 for the press-in alignment pin 501 is located beneath the return spring 301, this takes advantage of the difference between the depth of that cavity and the overall molded height of the latch 300. This design conserves space in that it does not require separate areas to be devoted to both functions, which is a significant improvement over previous designs.

The latch 300 is retained to the CRU 500 via another piece of pressed-in hardware that fits into a retaining groove 303 in the latch 300. This retaining hardware is, e.g., a PEM self-clinching standoff fastener 502. The plastic latch 300 is sized and designed to be retained by a single screw driven into the self-clinching fastener 502. The extended length of retaining groove 303 provides relief around the screw head and near the top of the self-clinching fastener 502, which allows for motion while not retaining the latch 300 too tightly.

Figure 6:
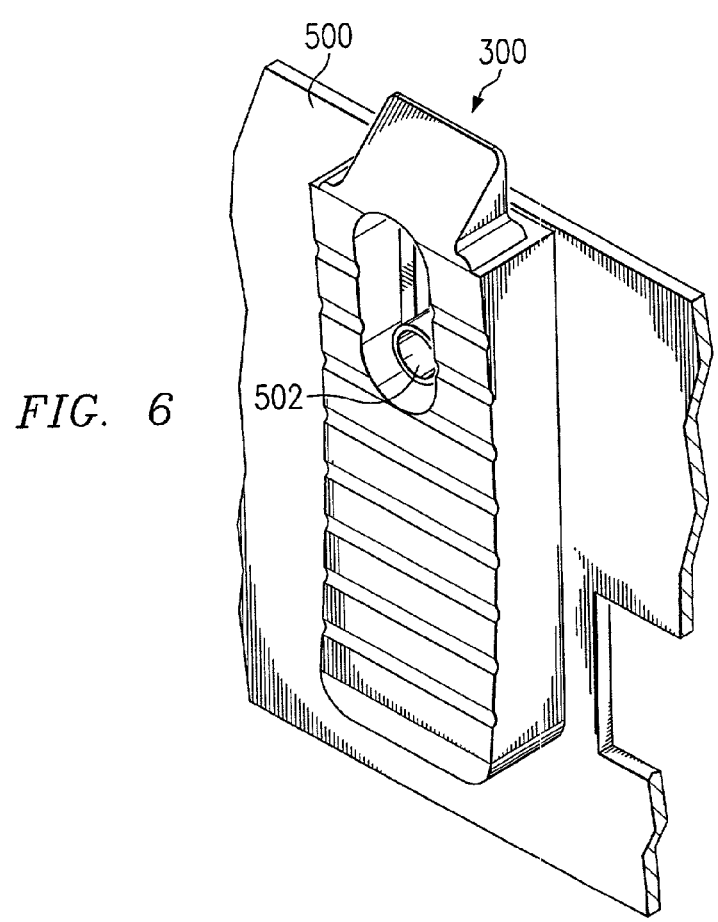
FIG. 6 depicts a front view pictorial diagram illustrating the latch attached to the CRU in accordance with the present invention.

FIG. 6 depicts a front view of the latch 300 attached to the CRU 500. This view clearly illustrates how the self-clinching fastener 502 retains the latch 300, while still having the relief space described above.

An alternate embodiment of the present invention uses a plastic spring that is integral with the latch body. One end of the spring is attached internally to the latch. The other end captures the alignment pin on the CRU. This accordion-pleated spring compresses on actuation and then restores itself to its unactuated position via forces stored in the plastic spring. The nature of such springs suggests that an alternate material would be more appropriate for such a design. This type of spring is best made with tough materials such as nylons and polypropylene. There may also be a tendency for engineering plastics such as ABS or Lexan to crack under repeated loading. This integral spring is designed to completely surround the alignment pin and fully capture it, which results in forced positional consistency. The interference of the periphery of the spring and sides of the cavity provides the alignment. Spring radii are designed to be generous and to thus limit build-up stresses during operation.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A latch for retaining moving parts on an enclosure service module (ESM), the latch comprising:
   a retaining groove that holds a fastening pin of the ESM;
   a return spring within a molded cavity in the latch; and
   an alignment groove placed at and extending away from one end of the return spring, wherein the alignment groove guides opposing sides of an alignment pin of the ESM into a secure position within the alignment groove as the latch is being attached to the ESM, and wherein the return spring applies pressure against the alignment pin while the alignment pin is in the alignment groove, wherein the ESM has a plurality of electronic components contained therein and wherein the latch is operable for retaining the moving parts on the ESM, wherein the fastening pin of the ESM is a self-clinching standoff fastener, and wherein the latch holds insertion/extraction levers of the ESM in a folded and locked position when the latch is clinched to the fastening pin of the ESM.

2. The latch according to claim 1, wherein the latch is molded from plastic resin.

3. The latch according to claim 2, wherein the latch is molded from acrylonitrile butadiene styrene.

4. The latch according to claim 2, wherein the latch is molded from Lexan.

5. The latch according to claim 2, wherein the latch is molded from an alloy of multiple plastic resins.

6. The latch according to claim 1, wherein the side opposite the molded cavity is textured to provide a non-slip grip.

7. The latch according to claim 1, wherein the latch holds insertion/extraction levers of the ESM in a folded and locked position when the ESM is installed in a data storage system.

8. A latch for retaining moving parts on an enclosure service module (ESM), the latch comprising:
   a retaining groove that holds a fastening pin of the ESM; and
   a return spring within a molded cavity in the latch, wherein the return spring is attached to the latch at one end, and wherein the other end of the return spring (i) captures an alignment pin of the ESM and (ii) aligns the alignment pin in a secure position by applying pressure against the alignment pin as the latch is being attached to the ESM, wherein the ESM has a plurality of electronic components contained therein and wherein the latch is operable for retaining the moving parts on the ESM, wherein the fastening pin of the ESM is a self-clinching standoff fastener, and wherein the latch holds insertion/extraction levers of the ESM in a folded and locked position when the latch is clinched to the fastening pin of the ESM.

9. The latch according to claim 8, wherein the latch is molded from plastic resin.

10. The latch according to claim 9, wherein the latch is molded from acrylonitrile butadiene styrene.

11. The latch according to claim 9, wherein the latch is molded from Lexan.

12. The latch according to claim 9, wherein the latch is molded from an alloy of multiple plastic resins.

13. The latch according to claim 8, wherein the side opposite the molded cavity is textured to provide a non-slip grip.

14. The latch according to claim 8, wherein the return spring is molded from nylon.

15. The latch according to claim 8, wherein the return spring is molded from polypropylene.

16. The latch according to claim 8, wherein the latch holds insertion/extraction levers of the ESM in a folded and locked position when the ESM is installed in a data storage system.

* * * * *